(12) United States Patent
Katou (10) Patent No.: US 8,585,549 B2
(45) Date of Patent: Nov. 19, 2013

(54) HYDRAULIC CONTROL DEVICE FOR AUTOMATIC TRANSMISSION

(75) Inventor: Yoshiaki Katou, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/576,840

(22) PCT Filed: Dec. 27, 2010

(86) PCT No.: PCT/JP2010/073490
§ 371 (c)(1),
(2), (4) Date: Aug. 2, 2012

(87) PCT Pub. No.: WO2011/111280
PCT Pub. Date: Sep. 15, 2011

(65) Prior Publication Data
US 2012/0309591 A1    Dec. 6, 2012

(30) Foreign Application Priority Data
Mar. 11, 2010  (JP) ................................ 2010-054127

(51) Int. Cl.
*B60W 10/06* (2006.01)
*B60W 10/10* (2012.01)

(52) U.S. Cl.
USPC ........................................................ 477/115

(58) Field of Classification Search
USPC ................................ 477/115, 127
See application file for complete search history.

(56) References Cited

U.S. PATENT DOCUMENTS

| | | | |
|---|---|---|---|
| 8,382,626 B2 * | 2/2013 | Moorman et al. | 475/129 |
| 2005/0221952 A1 * | 10/2005 | Tetsuno et al. | 477/115 |
| 2010/0236231 A1 | 9/2010 | Miyabe et al. | |
| 2011/0039657 A1 * | 2/2011 | Gibson et al. | 477/115 |

FOREIGN PATENT DOCUMENTS

| | | |
|---|---|---|
| JP | 10-324177 A | 12/1998 |
| JP | 2002-115755 A | 4/2002 |
| JP | 2002-130450 A | 5/2002 |
| JP | 2007-270953 A | 10/2007 |
| JP | 2007-270954 A | 10/2007 |
| JP | 2010-216643 A | 9/2010 |

* cited by examiner

*Primary Examiner* — Edwin A Young
(74) *Attorney, Agent, or Firm* — Foley & Lardner LLP

(57) ABSTRACT

An accumulator (40) is connected to a line pressure oil passage (33) via an electromagnetic cut-off valve (42) and a one-way valve (39), a three-way electromagnetic switching valve (44), and a pressure holding valve (46) are additionally installed on clutch pressure oil passage (34) of a low clutch (50) which is engaged at a time of an engine stop. The accumulator is cut off from the line pressure oil passage and the low clutch is communicated with the pressure holding valve and the clutch pressure is held to a value immediately before a torque transmission control, at the time of the engine stop and, during an engine restart, the electromagnetic cut-off valve is duty controlled in accordance with an accelerator opening angle and the clutch pressure is discharged from the accumulator.

5 Claims, 5 Drawing Sheets

HYDRAULIC CONTROL DEVICE FOR AUTOMATIC TRANSMISSION

TECHNICAL FIELD

The present invention relates to a hydraulic pressure control apparatus for an automatic transmission in a vehicle in which an idling stop is carried out.

BACKGROUND ART

A plurality of clutches and brakes (hereinafter, represented simply by clutches) which are operated to depress frictional plates under pressure by means of a hydraulic pressure are installed within a gear train in an automatic transmission. Thus, a plurality of gear shift stages are achieved according to a combination of engagements of the clutches and/or releases thereof. For example, a low clutch (LOW/C), a high clutch (HIGH/C), and so forth are installed. At a forward first speed, the low clutch is engaged. At a high-speed third speed, the low clutch is released and the high clutch is engaged.

Each clutch is provided with a hydraulic pressure chamber and a piston which strokes according to a working hydraulic pressure supplied to the hydraulic pressure chamber. An operation process of each clutch includes: a stage of a stroke end at a free running interval until the piston is contacted on the frictional plate; and a torque transmission control stage at which the piston actually depresses the frictional plate under pressure and the working hydraulic pressure is controlled to be varied to a maximum engagement pressure in order to smoothly vary the contact state of the piston and the frictional plate from a slip state to a completely engaged state.

In a vehicle in which such an automatic transmission as described above is mounted, in order to improve a fuel economy and to reduce a quantity of exhaust gas, an idling stop function is conventionally equipped in which an engine is automatically stopped in a case where the vehicle is temporarily stopped due to a signal wait at a traffic intersection during a traveling of the vehicle or in a case where the vehicle is waiting for a passage of a train at a railroad crossing and is, thereafter, started with the engine re-started when a predetermined condition is established.

Incidentally, the above-described clutch is engaged and released using the hydraulic pressure through a mechanical oil pump driven by means of an engine power. However, since the operation of the mechanical oil pump is stopped during the engine stop of the idling stop, the required hydraulic pressure cannot immediately be obtained at the time of the restart of the vehicle.

In addition, in one of the clutches to be engaged at a first speed for the re-start of the vehicle, the working oil of the hydraulic pressure chamber is drained during the idling stop. The oil quantity for the stroke end stage is demanded. Hence, such a problem that a desired response characteristic cannot be obtained at the time of restart after the idling stop is raised. A demand on a response characteristic is, specially, large in a case where the restart is a forward direction of the vehicle.

Therefore, for example, in a Japanese Patent Application First Publication (tokkai) No. 2002-115755, a hydraulic pressure control apparatus has been proposed in which an electrically driven oil pump is additionally installed in the automatic transmission and the hydraulic pressures from these respective hydraulic pressures are supplied to the starting clutch by a combination of an electrically driven oil pump and an accumulator within a hydraulic pressure circuit.

PRE-PUBLISHED DOCUMENT

Patent Document 1: Japanese Patent Application First Publication (tokkai) No. 2002-115755.

DISCLOSURE OF THE INVENTION

Problem to be Solved by the Invention

However, in the above-described conventional hydraulic pressure control apparatus, apart from the mechanical oil pump, an additional pump mechanism and a motor to drive this pump mechanism are needed so that a large sizing of the automatic transmission and a cost increase have been introduced.

In addition, since the electrically driven oil pump requires a large power, a consumption of the battery excessively becomes increased.

Hence, it is an object of the present invention to provide a hydraulic pressure control apparatus for an automatic transmission which is capable of obtaining a favorable restart response characteristic at a time of the idling stop while the electrically driven oil pump is not needed.

Means for Solving the Problem

The hydraulic pressure control apparatus for the automatic transmission, the automatic transmission being mounted in the vehicle which makes an engine stop under a predetermined stop condition and makes the engine restart under a predetermined start condition, the hydraulic pressure control apparatus comprising: pressure accumulating means connected to a hydraulic pressure supply passage directed toward a clutch of the automatic transmission via an electromagnetic cut-off valve, the clutch being engaged at a time of a start of the vehicle; pressure holding means for holding a working hydraulic pressure of the clutch at a predetermined value; and control means for controlling the electromagnetic cut-off valve, wherein the control means, at a time of the engine stop, cuts off the pressure accumulating means from the hydraulic pressure supply passage to hold the hydraulic pressure of the hydraulic pressure supply passage at the predetermined value through the pressure holding means and, at a time of a restart of the engine, discharges a working oil charged in the pressure accumulating means into the hydraulic pressure supply passage through the electromagnetic cut-off valve.

Effects of the Invention

According to the present invention, even if a sufficient hydraulic pressure is not supplied from the oil pump in a transient state immediately after the engine has restarted, the hydraulic pressure is supplied to the clutch described above while a shelf pressure control is carried out by performing a discharge hydraulic pressure control of pressure accumulating means for the working hydraulic pressure held at the predetermined value through the electromagnetic cut-off valve. Hence, a shock-free torque transmission with a high response characteristic can be started at an earlier stage and the vehicle start is carried out.

Thus, an installation of the additionally electrically driven oil pump is not needed.

DETAILED DESCRIPTION OF THE EMBODIMENTS

Next, a preferred embodiment according to the present invention will be described.

Figure 1:
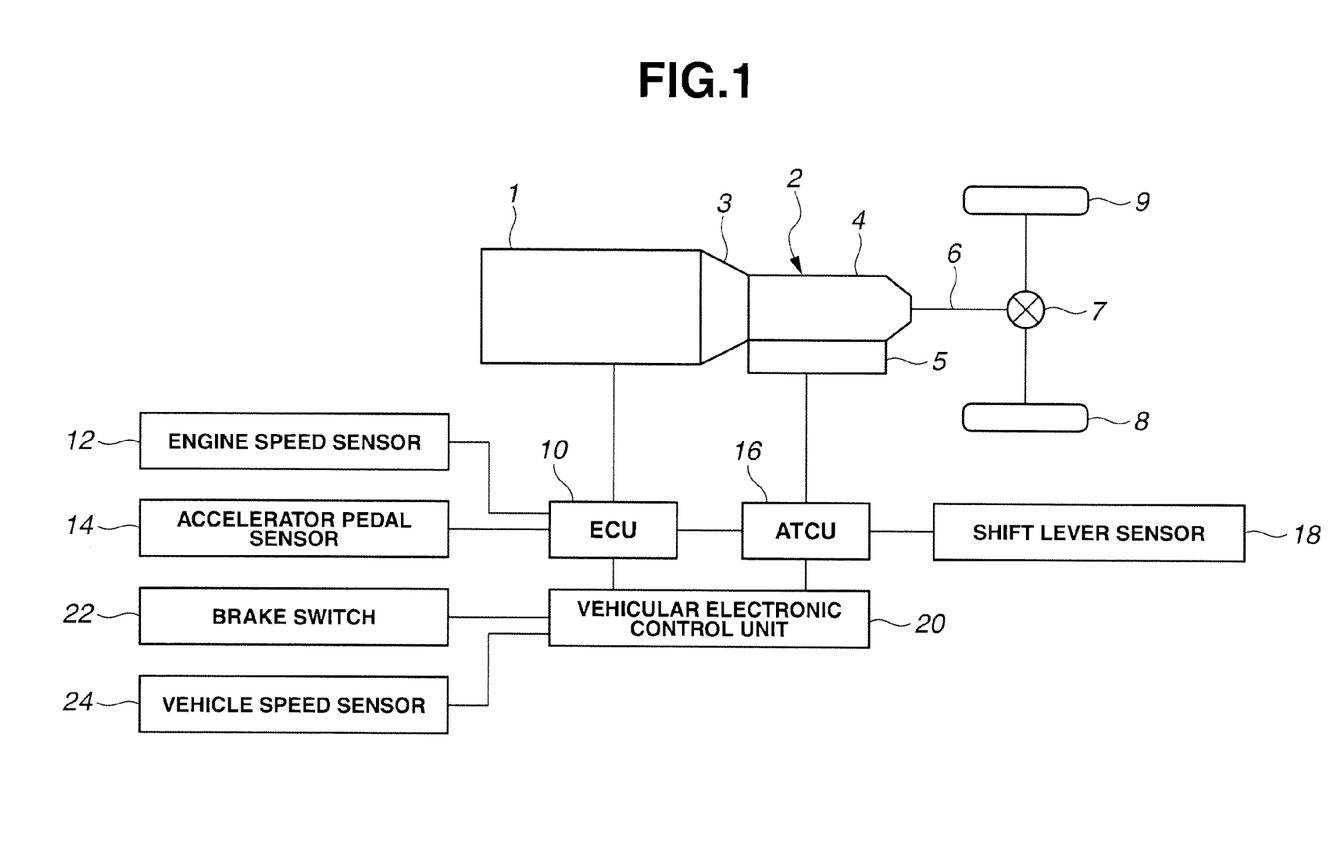
FIG. 1 is a configuration view representing a drive train of a vehicle to which a preferred embodiment according to the present invention is applicable.

FIG. 1 shows a diagram representing a drive system of the vehicle according to the present invention.

An automatic transmission 2 is coupled to an output shaft of an engine 1. Automatic transmission 2 includes a torque converter 3, a gear shift mechanism section 4, and a hydraulic pressure control valve unit 5.

An output of automatic transmission 2 is transmitted to driving wheels 8, 9 from a drive shaft 6 via a differential gear 7.

An engine control unit (ECU) 10 to control an ignition timing and so forth, a throttle valve (not shown), and a fuel injection valve are connected to engine 1. An automatic transmission control unit (ATCU) 16 to control a target gear shift stage and a working hydraulic pressure supplied to one or more of clutches to achieve the target gear shift stage is connected to automatic transmission 2.

A vehicular electronic control unit 20 is connected to engine control unit 10 and automatic transmission control unit 16.

A number of revolutions per unit time (engine speed) of the engine output shaft is inputted to engine control unit 10 and an accelerator opening angle is inputted from an accelerator pedal sensor 14 via engine control unit 10.

A shift lever position is inputted to automatic transmission control unit 16 from a shift lever sensor 18 and engine revolution speed and accelerator opening angle are inputted thereto via engine control unit 10.

Signals from brake switch 22 and vehicle speed sensor 24 are inputted to vehicular electronic control unit 20, the accelerator opening angle being inputted thereto via engine control unit 10, the shift lever position being inputted thereto via automatic transmission control unit 16, and a control command is issued from vehicular electronic control unit 20 to engine control unit 10 and automatic transmission control unit 16 in order to perform an overall control for engine 1 and automatic transmission 2 on a basis of a driving state of the vehicle.

Vehicular electronic control unit 20 provides an automatic stop condition of engine 1, especially in the control of the idling stop, when the vehicle is in a stopped state (vehicle speed=0), the shift lever is at a N (Neutral) position or a P (Parking) position, and accelerator opening angle of 0 (a state in which the accelerator pedal is not depressed) or when the vehicle is in the stopped state, the shift lever is at a D (Drive) position, accelerator opening angle of 0, and a brake ON state (a state in which a brake pedal is depressed).

It should be noted that a restart condition of engine 1 is a state in which the above-described automatic stop condition does not become established.

Vehicular electronic control unit 20 outputs an engine stop command and an engine restart command to engine control unit 10 respectively corresponding to the establishment of the automatic stop condition and to the establishment of the engine restart condition. Then, engine control unit 10 stops and restarts engine 1 on a basis of these commands.

In addition, the command of the engine stop and the command of the engine restart are outputted to automatic transmission control unit 16 and automatic transmission control unit 16 performs an idling stop corresponding control as will be described later for automatic transmission 2.

Figure 2:
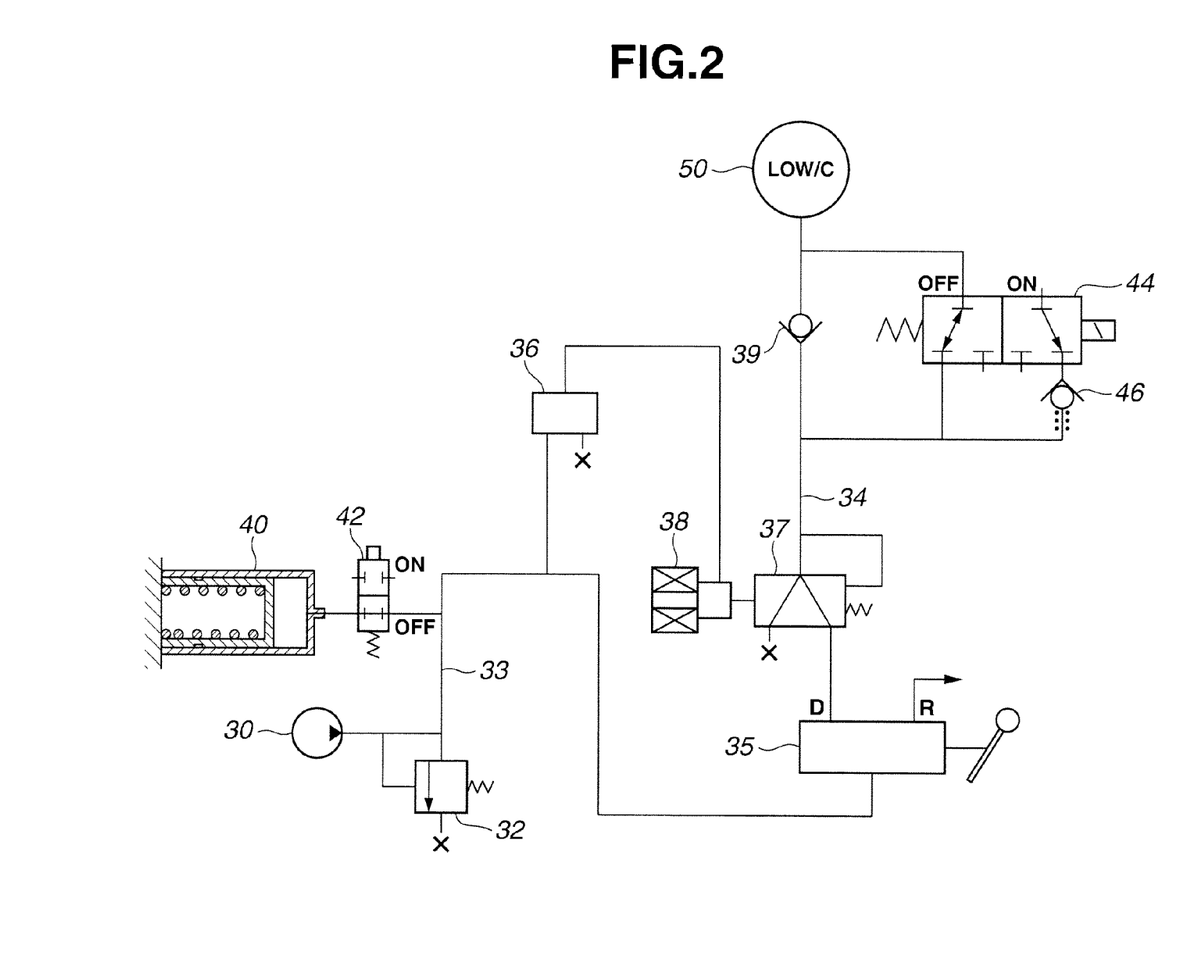
FIG. 2 is a hydraulic pressure circuit related to an idling stop.

FIG. 2 shows a hydraulic pressure circuit related to the idling stop.

An output of an oil pump 30 driven through a revolution of the output shaft of engine 1 is regulated to be a line pressure by means of a regulator valve 32 and this line pressure is inputted to an input port P of a manual valve 35 via a line pressure oil passage 33.

A D range port D of manual valve 35 is connected to a hydraulic pressure chamber of a low clutch (LOW/C) 50 which is engaged at a forward first speed sequentially via a control valve 37 and a one-way valve 39.

Control valve 37 controls a pilot pressure generated from the line pressure through a pilot valve 36 using a solenoid 38 to provide a drive pressure and controls a hydraulic pressure (a clutch pressure) to low clutch 50 to be outputted to a clutch pressure oil passage 34.

It should be noted that, although D range port D of manual valve 35 is connected to other clutch systems engaged at a higher speed range and an R range port R is connected to a clutch system which is engaged at a reverse speed stage, these related parts are omitted fro FIG. 2.

An accumulator 40 is connected via an electromagnetic cut-off valve 42 to line pressure oil passage 33 directed toward the input port of manual valve 35. Electromagnetic cut-off valve 42 communicates accumulator 40 with line pressure oil passage 33 when electromagnetic cut-off valve 42 is in an OFF state and cuts off this communication when electromagnetic cut-off valve 42 is in an ON state to provide a duty control for electromagnetic cut-off valve 42.

During the travel at the D range of the shift lever, electromagnetic cut-off valve 42 is held at the OFF state so that accumulator 40 is communicated with line pressure oil passage 33. Hence, accumulator 40 is in a state in which the working oil is filled therein and accumulator 40 holds an accumulator pressure equivalent to the line pressure.

In addition, a three-way electromagnetic switching valve 44 is disposed in parallel to one-way valve 39. Three-way electromagnetic switching valve 44, in the OFF state, communicates low clutch 50 side of one-way valve 39 with a control valve side 37 of check valve 39 and, in the ON state, connects low clutch side 50 of check valve 39 to a pressure holding valve (or a pressure-relief valve) 46. During the ordinary driving of the vehicle, the three-way electromagnetic switching valve 44 is in the OFF state.

Pressure holding valve 46 drains when the hydraulic pressure inputted via three-way electromagnetic switching valve 44 is higher than a predetermined value and holds the hydraulic pressure at the predetermined value when the inputted hydraulic pressure is reduced and reached to the predetermined value.

An idling stop corresponding control of automatic transmission 2 by means of automatic transmission control unit 16 is carried out as follows.

Figure 3:
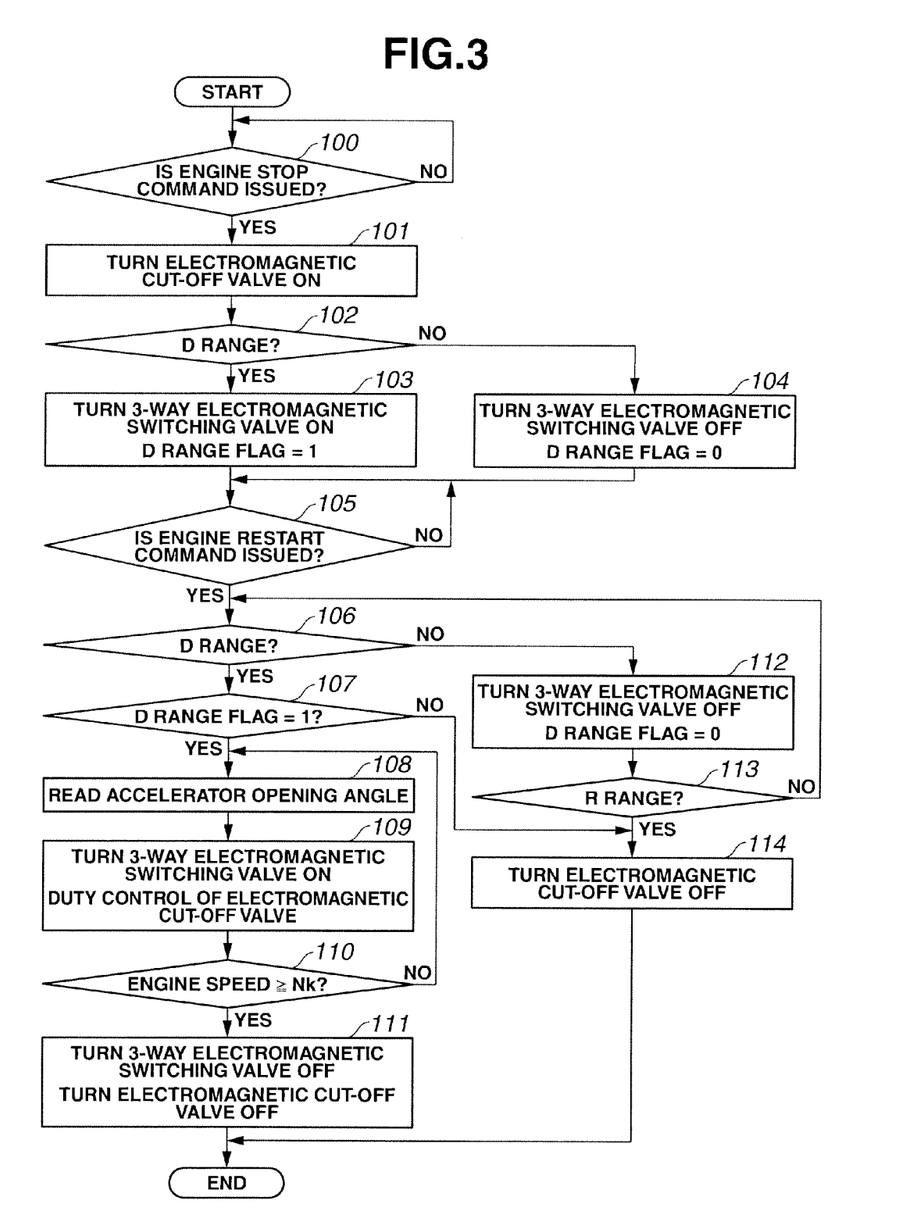
FIG. 3 is a flowchart representing a flow of an idling stop corresponding control.

FIG. 3 shows a flowchart representing a flow of the idling stop corresponding control.

First, at a step 100, automatic transmission control unit 16 checks to see if an engine stop command is issued from vehicular electronic control unit 20.

If the engine stop command is issued, automatic transmission control unit 16 turns on electromagnetic cut-off valve 42, at a step 101. Thus, the working oil of the accumulator pressure is retained within accumulator 40.

At a step 102, automatic transmission control unit 16 checks to see whether the shift lever is placed at the D range.

In a case where the shift lever is placed at a D range position, the routine goes to a step 103. At step 103, automatic transmission control unit 16 sets a D range flag to "1" and turns on electromagnetic switching valve 44. Thus, low clutch 50 is cut off from a control valve side 37 and is communicated with pressure holding valve 46. Then, pressure holding valve 46 holds the hydraulic pressure of a low clutch side 50 at the predetermined value.

It should be noted that the predetermined value of the working hydraulic pressure held by pressure holding valve 46 is a hydraulic pressure value corresponding to a state in which the frictional plates of low clutch 50 are not completely engaged but no clearance required for the end stage of the piston stroke is present, in other words, the predetermined value is set to a value immediate before a torque transmission control.

After three-way electromagnetic switching valve 44 is turned on, the routine goes to a step 105.

On the other hand, if the shift lever is not placed at the D range position, the routine goes to a step 104. At step 104, automatic transmission control unit 16 continues three-way electromagnetic switching valve 44 to be in the OFF state and resets D range flag to "0" and the routine goes to a step 105.

It should be noted that the state of D range flag and state of three-way electromagnetic switching valve 44 which are once set are not changed, during the engine stop, even if an operation of the shift lever occurs.

At step 105, automatic transmission control unit 16 checks to see whether an engine restart command is issued from vehicular electronic control unit 20.

While no command to restart the engine is issued, step 105 is repeated.

In response to the command of the engine restart, engine control unit 10 starts a cranking to start engine 1.

When automatic transmission control unit 16 simultaneously receives this engine restart command, this control unit 16 again checks to see if the shift lever is at the D range position. This is because, during the engine stop, there is often the case in which a vehicle driver operates the shift lever.

When the shift lever is placed at the D range position, automatic transmission control unit 16 checks to see whether D range flag is "1".

If D range flag is "1", the shift lever is held at the D range position for a time duration before and after the engine restart and three-way electromagnetic switching valve 44 is turned to ON. In this case, the routine goes to a step 108. The accelerator opening angle by means of an accelerator pedal sensor 14 is read via engine control unit 10.

Then, the working oil is discharged from accumulator 40 by performing a duty control for electromagnetic cut-off valve 42 with three-way electromagnetic switching valve 44 kept to be turned ON, at a step 109.

Figure 4:
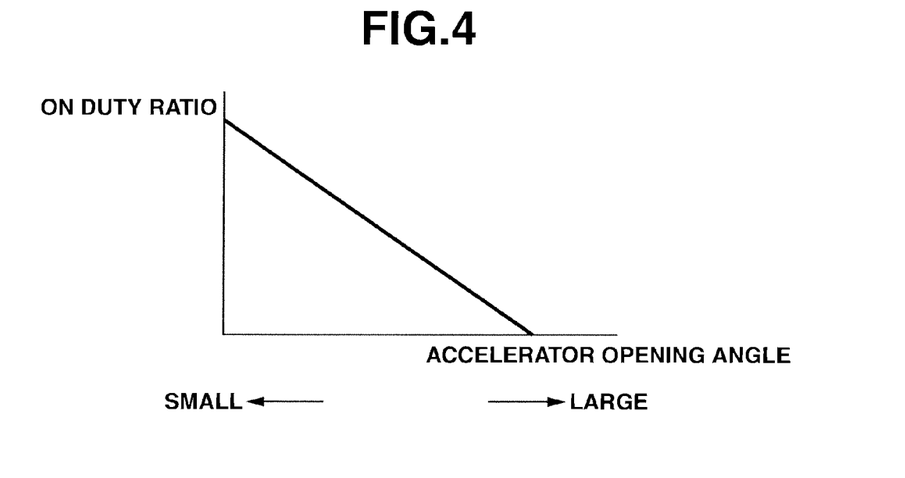
FIG. 4 is a graph representing a duty control procedure of an electromagnetic cut-off valve.

At step 109, as shown in FIG. 4, an ON duty ratio becomes larger as the accelerator opening angle becomes smaller and, as the accelerator opening angle becomes larger, the ON duty ratio is set to become reduced.

It should be noted that low clutch 50 is in a clutch pressure state corresponding to a state in which low clutch 50 is communicated with pressure holding valve 46 due to the ON state of electromagnetic switching valve 44 and the full stroke of the position of low clutch 50 is ended. Hence, low clutch 50 is immediately started to depress the frictional plates to enter the torque transmission control state.

At a step 110, automatic transmission control unit 16 reads the engine speed via engine control unit 10 and checks to see whether the engine speed is equal to or larger than a predetermined engine speed Nk representing a complete explosion of the engine which has restarted. If engine speed<Nk, the routine returns to step 108. At step 108 and, thereafter, automatic transmission control unit 16 continues the duty control for electromagnetic cut-off valve 42 on a basis of the accelerator opening angle.

If the engine speed is equal to or larger than Nk, the routine goes to a step 111. At step 111, automatic transmission control unit 16 turns both of three-way electromagnetic switching valve 44 and electromagnetic cut-off valve 42 to OFF and ends the idling stop corresponding control.

Since a sufficient working hydraulic pressure is supplied from oil pump 30 after the engine is completely exploded, due to the OFF state of three-way electromagnetic switching valve 42, low clutch 50 is separated from pressure holding valve 46 and an ordinary control pressure is supplied to low clutch 50 which is connected to control valve 37. In addition, since the OFF state of electromagnetic cut-off valve 42 is maintained, the line pressure is charged to accumulator 40.

If the shift lever is not placed at the D range position at step 106, the routine goes to a step 112. At step 112, the D range flag is reset to "0" and three-way electromagnetic switching valve 44 is turned to OFF.

Thus, even in a case where the shift lever at the time of the engine stop is placed at the D range position and electromagnetic switching valve 44 is turned to ON, low clutch 50 is communicated with control valve 37 so that the clutch pressure of low clutch 50 is enabled to be drained.

Next, at a step 113, automatic transmission control unit 16 checks to see whether the shift lever is placed at an R range position.

If the shift lever is placed at the R range position, the routine goes to a step 114 to turn OFF electromagnetic cut-off valve 42 and, thereafter, control is ended. Due to the OFF state of electromagnetic cut-off valve 42, accumulator 40 which has been cut off from line pressure oil passage 33 is returned in a communication state from line pressure oil passage 33.

On the other hand, if the shift lever is not placed at the R range position at step 113, the shift lever is placed at either N range or P range position and it is uncertain whether the shift lever is, in the near future, manipulated to to D range or R range position. Hence, the routine returns to step 106 with electromagnetic cut-off valve kept at the ON state.

Next, if, at step 107, D range flag is "0", the routine goes to step 114.

"0" of the D range flag means that the shift lever is manipulated from any other position than the D range to D range position during the engine stop. Since three-way electromagnetic switching valve 44 is not turned to ON, low clutch 50 is communicated with control valve 37 and the working oil of low clutch 50 is drained through control valve 37.

Since, at step 114, electromagnetic cut-off valve 42 is held to be turned to OFF, the working oil from accumulator 40 is exhausted in a stepwise manner to line pressure oil passage 33.

Figure 5:
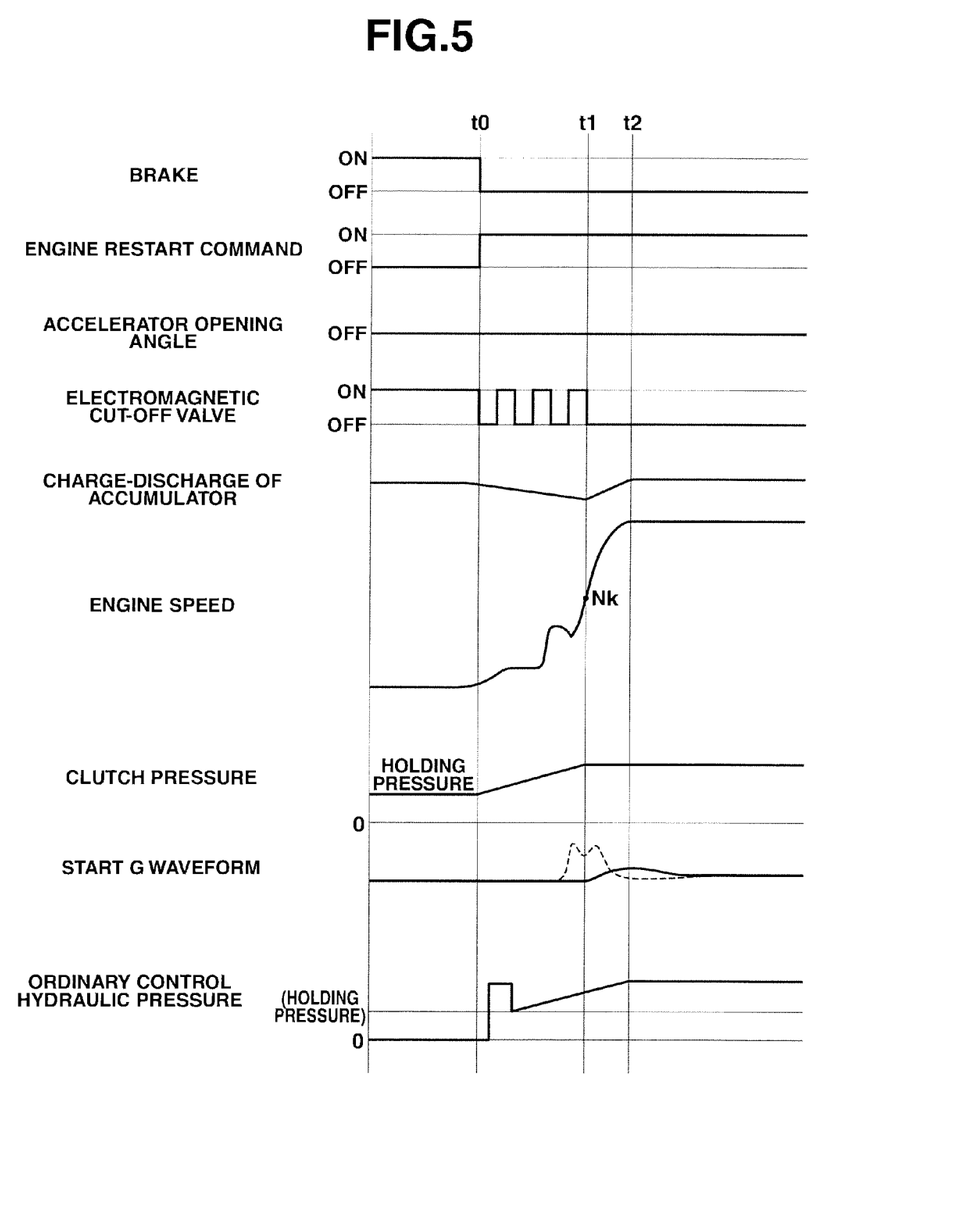
FIG. 5 is a timing chart representing an operation process at a time of restart of an engine.

FIG. 5 shows a timing chart representing an operation process when the engine is restarted from a state in which the engine is stopped with the shift lever placed at the D range position according to the control described above.

During the engine stop according to the idling stop, the brake signal is in the ON state, the accelerator opening angle is 0, electromagnetic cut-off valve 42 is in the ON state, accumulator 40 is held in a state in which the working oil is charged, and the clutch pressure of low clutch 50 is held at the pressure holding state.

At a time t0, the brake signal is turned to the OFF state. Then, an engine start command is issued (ON) so that a cranking is started and the engine speed is irregularly started to rise.

At the same time, electromagnetic cut-off valve 42 repeats the ON state and OFF state due to the duty control. Since, in a case of zero accelerator opening angle, the ON duty is large so that the working oil of accumulator 40 is discharged at a moderate speed.

While the engine speed is sufficiently low so that a sufficient hydraulic pressure is not generated from oil pump 30, the working oil discharge from accumulator 40 causes the hydraulic pressure to be supplied to low clutch 50 via manual valve 35, control valve 37, and one-way valve 39. Since the stroke end stage of low clutch 50 is finished under the holding pressure, the rise in the clutch pressure started from the holding pressure is started and the engagement of the clutch is immediately started. However, a degree of rise in the clutch pressure is such that the rise in the hydraulic pressure is extremely moderate due to the moderate discharge of the accumulator. Hence, as shown in a waveform of start acceleration (G), an engagement shock such as shown in a broken line in FIG. 5 which could be generated when discharged in the stepwise manner is not introduced but a smooth vehicle start is resulted.

Then, if the engine speed is reached to predetermined speed Nk representing the complete explosion, oil pump 30 generates the hydraulic pressure so that the line pressure indicates the normal value. Hence, at a time t1, electromagnetic cut-off valve 42 is turned in the OFF state with the duty control stopped so that accelerator 40 is always in the communication state with line pressure oil passage 33. Thus, accumulator 40 which was hitherto in the discharge state is in the charge state from line pressure oil passage 33 and the charge quantity is in the increase direction.

In addition, at a time t1, three-way electromagnetic switching valve 44 is turned to the OFF state and the line pressure is supplied to low clutch 50 via control valve 37. Thus, while, in the conventional ordinary control hydraulic pressure as a comparative example, the clutch pressure cannot be a steady-state pressure until the subsequent time of t2, the clutch pressure can be controlled to be under the steady-state pressure and the clutch pressure control by means of control valve 37 becomes possible.

Since the accelerator opening angle is held at "0" in the timing chart of FIG. 5, a moderate creep start is resulted. Since the depression of the accelerator pedal is large and, as the accelerator opening angle becomes larger, the discharge speed from accumulator 40 is set to be high and, hence, a high response characteristic can be obtained.

In the preferred embodiment, low clutch 50 corresponds to the clutch engaged at the time of a vehicle start in the case of the present invention and line pressure oil passage 33 corresponds to the hydraulic pressure supply passage.

Then, one-way valve 39, three-way electromagnetic switching valve 44, and pressure holding valve 46 constitute pressure holding means and three-way electromagnetic switching valve 44 corresponds to a switching valve. Accumulator 40 corresponds to pressure accumulating means.

In addition, a function part of automatic transmission control unit 16 executing processes of steps 100 through 114 in the flowchart of FIG. 3 constitutes control means.

The embodiment described above is structured as described above. In the vehicle making engine 1 stop under the predetermined stop condition and making engine 1 restart under the predetermined start condition, accumulator 40 is provided which is connected via electromagnetic cut-off valve 42 to line pressure oil passage 33 which provides the hydraulic pressure supply passage for low clutch 50 of automatic transmission 2, low clutch 50 being engaged at the time of start of the vehicle, pressure holding valve 46 or so forth is used to hold the working hydraulic pressure of low clutch 50 at the predetermined value, at the time of the stop of engine 1, and the working oil charged in accumulator 40 is discharged to line pressure oil passage 33 at the time of restart of engine 1. Hence, even if a sufficient hydraulic pressure from oil pump 30 is not supplied in a transient state immediately after the restart of engine 1, the working hydraulic pressure in which the pressure holding at the predetermined value is added to the discharge part of the accumulator is supplied to low clutch 50. Thus, the torque transmission can, at an earlier stage, be started and the start of the vehicle at a high response characteristic is carried out. Hence, an additional electrically driven oil pump is not needed (an effect of claim 1).

Especially, the predetermined value held as the holding pressure is the value immediately before the torque transmission control in low clutch 50 and the piston of low clutch 50 is in the stroke ended state. Hence, accumulator 40 does not require a capacity equivalent to the stroke end of the piston of low clutch 50 so that a small sized accumulator having a small capacity can be provided for accumulator 40 (an effect of the claim 2).

In addition, electromagnetic cut-off valve 42 is, to especially, under the duty control in accordance with the accelerator opening angle when the working oil of accumulator 40 is discharged. Hence, the torque transmission control is possible in accordance with the accelerator opening angle when the working oil of accumulator 40 is discharged. Hence, the torque transmission control is possible in accordance with the accelerator opening angle from the first time of engine restart (an effect of the claim 3).

The holding of the working hydraulic pressure of low clutch 50 at the predetermined value is carried out only when the D range is selected at the time of a stop of engine 1 so that a speedy complete release of low clutch 50 can be secured in a case where it is not necessary for low clutch 50 to be engaged at the time of the engine restart at a range position except the D range (an effect of the claim 4).

A specific structure of holding the working hydraulic pressure of low clutch 50 at the time of engine stop at the predetermined value includes one-way valve 39 interposed between low clutch 50 and control valve 37, to allow a circulation only toward a low clutch 50 direction; pressure holding valve 46 configured to hold the working hydraulic pressure exceeding the predetermined value at the predetermined value; and three-way electromagnetic switching valve 44 configured to switch and connect low clutch 50 side of one-way valve 39 to either control valve 37 side or pressure holding valve 46 side, wherein three-way electromagnetic switching valve 44 is configured to communicate low clutch 50 side of one-way valve 39 with control valve 37 side when the ordinary traveling in which the D range is selected and configured to communicate low clutch 50 side of one-way valve 39 with pressure holding valve 46 when the D range is selected during the idling stop.

Hence, the clutch pressure can simply but accurately be held at the predetermined value (an effect of the claim 5).

It should be noted that, in the preferred embodiment, vehicular electronic control unit 20 determines the engine stop and the engine restart and the idling stop corresponding control in automatic transmission 2 is carried out in automatic transmission control unit 16. In addition, automatic transmission control unit 16 obtains pieces of information on the engine speed and the accelerator opening angle via engine control unit 10.

However, the present invention is not limited to this. Automatic transmission control unit 16 nay directly input each of the pieces of information. On the contrary, automatic transmission control unit 16 may input the position of the shift lever via vehicular electronic control unit 20.

Furthermore, vehicular electronic control unit 20 and automatic transmission control unit 16 may be integrated together and an input route of each of the pieces of information may be arbitrary.

In addition, the accelerator opening angle by means of the accelerator pedal sensor may use a throttle opening angle by means of a throttle sensor of the engine.

EXPLANATION OF SIGNS

1 . . . engine
2 . . . automatic transmission
10 . . . engine control unit
12 . . . engine speed sensor
14 . . . accelerator pedal sensor
16 . . . automatic transmission control unit
18 . . . shift lever sensor
20 . . . vehicular electronic control unit
22 . . . brake switch
30 . . . oil pump
32 . . . regulator valve
33 . . . line pressure oil passage
34 . . . clutch pressure oil passage
35 . . . manual valve
36 . . . pilot valve
37 . . . control valve
38 . . . solenoid
39 . . . one-way valve
40 . . . accumulator
42 . . . electromagnetic cut-off valve
44 . . . three-way electromagnetic switching valve
46 . . . pressure holding valve
50 . . . low clutch

The invention claimed is:

1. A hydraulic pressure control apparatus for an automatic transmission, the automatic transmission being mounted in a vehicle which makes an engine stop under a predetermined stop condition and makes the engine restart under a predetermined start condition, the hydraulic pressure control apparatus comprising: pressure accumulating means connected to a hydraulic pressure supply passage directed toward a clutch of the automatic transmission via an electromagnetic cut-off valve, the clutch being engaged at a time of a start of the vehicle;
   pressure holding means for holding a working hydraulic pressure of the clutch at a predetermined value; and
   control means for controlling the electromagnetic cut-off valve, wherein the control means, at a time of the engine stop, cuts off the pressure accumulating means from the hydraulic pressure supply passage to hold the hydraulic pressure of the hydraulic pressure supply passage at the predetermined value through the pressure holding means and, at a time of a restart of the engine, discharges a working oil charged in the pressure accumulating means into the hydraulic pressure supply passage through the electromagnetic cut-off valve.

2. The hydraulic pressure control apparatus for the automatic transmission as claimed in claim 1, wherein the predetermined value of the working hydraulic pressure of the clutch held by the pressure holding means is a value immediate prior to a torque transmission control in the clutch.

3. The hydraulic pressure control apparatus for the automatic transmission as claimed in claim 1, wherein the control means performs a duty control for the electromagnetic cut-off valve in accordance with an accelerator opening angle of the vehicle when discharging the working oil in the pressure accumulating means.

4. The hydraulic pressure control apparatus for the automatic transmission as claimed in claim 1, wherein the pressure holding means holds the working hydraulic pressure of the clutch at the predetermined value only when a D range is selected at a time of the engine stop.

5. The hydraulic pressure control apparatus for the automatic transmission as claimed in claim 4, wherein the pressure holding means comprises: a one-way valve interposed between the clutch and the control valve, the control valve adjusting the working hydraulic pressure directed toward the clutch, to allow a circulation only toward a clutch direction; a pressure holding valve configured to hold the working hydraulic pressure at the predetermined value; and a switching valve configured to switch and connect the clutch side of the one-way valve to either the control valve side or the pressure holding valve, the switching valve being configured to communicate the clutch side of the one-way valve with the control valve side when an ordinary traveling in which the D range is selected is carried out and being configured to communicate the clutch side of the one-way valve with the pressure holding valve when the D range is selected during an idling stop.

* * * * *